United States Patent
Shin

(10) Patent No.: US 7,676,398 B2
(45) Date of Patent: Mar. 9, 2010

(54) METHOD FOR ELECTRONIC COMMERCE USING OPEN CABLE

(75) Inventor: Su-won Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1200 days.

(21) Appl. No.: 11/037,054

(22) Filed: Jan. 19, 2005

(65) Prior Publication Data

US 2005/0160015 A1     Jul. 21, 2005

(30) Foreign Application Priority Data

Jan. 20, 2004    (KR) ...................... 10-2004-0004291

(51) Int. Cl.
*G06Q 30/00*  (2006.01)
(52) U.S. Cl. .......................... 705/26; 705/27
(58) Field of Classification Search .................. 705/26, 705/27
See application file for complete search history.

(56) References Cited

U.S. PATENT DOCUMENTS

| 5,878,141 A | 3/1999 | Daly et al. |
| 6,014,636 A * | 1/2000 | Reeder ......................... 705/17 |
| 2003/0105679 A1* | 6/2003 | Krishnan et al. .............. 705/27 |

FOREIGN PATENT DOCUMENTS

| JP | 04-205224 A | 7/1992 |
| JP | 2002-196899 A | 7/2002 |
| JP | 2003-50677 A | 2/2003 |
| KR | 2001-0081015 A | 8/2001 |
| KR | 2002-0078359 A | 10/2002 |
| WO | WO 98/43427 A1 | 10/1998 |

OTHER PUBLICATIONS

Droitcourt J L: "Understanding How Interactive Television Set Top Box Works . . . And What it Will Mean to The Customer", International Broadcasting Convention, London, GB, vol. 413, Sep. 14, 1995, pp. 382-394, XP 000562377.
Society of Cable Telecommunications Engineers, SCTE: "POD Copy Protection System", STCE 41 2003 (Formerly DVS 301), Online! 2003, XP002324801.

* cited by examiner

*Primary Examiner*—Robert M. Pond
(74) *Attorney, Agent, or Firm*—Sughrue Mion, PLLC

(57) ABSTRACT

A method for electronic commerce including generating a host ID and a POD ID at a receiving device; transmitting purchase information on a product, the host ID and the POD ID to a service provider to request purchase of the product; determining whether the requested purchase is approved at the service provider by evaluation of the validity of the transmitted host ID and POD ID; and receiving information on whether the requested purchase is approvided or not at the receiving device. Accordingly, the method for electronic commerce has high security and is convenient to use.

15 Claims, 7 Drawing Sheets

FIG. 4

| TELEVISION ID | CABLE CARD ID | NAME | ADDRESS | CARD NUMBER | ... |
|---|---|---|---|---|---|
|  |  |  |  |  |  |
|  |  |  |  |  |  |
| ... | ... | ... | ... | ... | ... |
|  |  |  |  |  |  |

US 7,676,398 B2

METHOD FOR ELECTRONIC COMMERCE USING OPEN CABLE

This application is based upon and claims the benefit of priority to Korean Patent Application No. 2004-04291 filed on Jan. 20, 2004, in the Korean Intellectual Property Office, the disclosure of which is incorporated herein in its entirety by reference.

BACKGROUND OF THE INVENTION

1. Field of the Invention

The invention relates to a method for electronic commerce. More particularly, the invention relates to a method for electronic commerce using open cable, which enables electronic commerce such as home shopping through an open cable broadcast receiver of a home network.

2. Description of the Related Art

Open cable is a digital broadcast standard established by a U.S. private standard organization named 'Cable Labs'. The Federal Communications Commission (FCC) has mandated that domestic digital cable broadcasters adopt this open cable standard. When digital cable broadcast standards such as open cable are instituted, it will be possible to provide a two-way exchange of information, and electronic commerce using a television is expected to blossom.

Television home shopping is an example of electronic commerce using television, which combines broadcast and distribution. More specifically, television home shopping directly connects a manufacturer to a user to provide merchandise at a reasonable price, and speedily increase distribution. A growing number of users prefer such a system to traditional in-store shopping.

At least two television home shopping payment methods are known. First, a user may directly telephone a home shopping service provider to provide payment information. Alternatively, the user may transmit payment information via a television which can receive a data broadcast.

In the first method, the user calls a telephone number indicated on a commercial of a home shopping screen to either transmit payment information (e.g., name, address, credit card number) by an Automatic Response Service ("ARS"), or to communicate directly with a telemarketer to transmit the payment information. In contrast, the second method is similar to home shopping using the Internet. Specifically, when connected with a broadcast service provider by a two-way communication telephone line, if the user wishes to purchase a product shown on the television screen, a window appears on the screen to enable the user to input the payment information and to transmit the payment information via a telephone line to a service provider.

However, these conventional methods have drawbacks. The first method, where the user directly telephones a broadcast service provider, has weak security because technology such as wiretapping may intercept the transmission of the payment information, and is also inconvenient to use because payment information has to be indicated every time a purchase is desired.

The second method, where the user inputs payment information on the screen of television, is inconvenient to use because payment information must be input on the television screen by use of a remote controller, rather than a computer keyboard. Further, the second method provides weak security, as the payment information is transmitted without encoding or with only simple encoding. Alternatively, if the television is connected via a cable modem to a service provider, rather than via a telephone-line, security can be relatively increased. However, a security program must be installed, and it is more difficult to use such a security program with a television (rather than with a computer), and therefore it is still difficult to maintain security. As another alternative, since it is easier to maintain security and connect to a service provider using a computer (rather than a television), a system that provides home shopping by connecting a television to a computer has also been considered. However, the computer has to be continuously connected to the television to support this method. As an aside, when using a computer, payment information, such as serial number of smart card, can be stored therein. However, the smart card must be securely kept.

In contrast, when using open cable, a POD module is inserted into an open cable broadcast receiver (e.g., a television) to normally receive an open cable broadcast. When data is sent to and received from a service provider, a pair of a unique host ID and a POD ID, generated by using a high-security method, are used. Accordingly, open cable is considered to be efficiently applicable to ah electronic commerce method such as a home shopping payment.

SUMMARY OF THE INVENTION

The invention has been developed in order to solve the above drawbacks and other problems associated with the conventional arrangements. One aspect of the invention is to provide a method for electronic commerce using open cable that has high security and which is convenient for a user.

In order to achieve the above-described aspects and/or other features of the invention, there is provided a method for electronic commerce in one aspect of the invention, comprising: generating a host ID and a POD ID at a receiving device; transmitting a purchase information on a product, the host ID and the POD ID to a service provider to request purchase of the product; determining whether the requested purchase is approved at the service provider by evaluation of the validity of the transmitted host ID and POD ID; and receiving information on whether the requested purchase is approved or not at the receiving device. In another aspect of the invention, the information on whether the requested purchase is approved or not may comprise the host ID, the POD ID and information on whether a valid method of payment for the product is available. In another aspect of the invention, the method may further comprise transmitting a reply message to the information on whether the requested purchase is approved or not to the service provider. In another aspect of the invention, the reply message may be a purchase confirmation. In another aspect of the invention, the method may also further comprise completing the requested purchase at the service provider based upon the reply message, and receiving a confirmation of the completion of the requested purchase at the receiving device.

In another aspect of the invention, the service provider may maintain a payer information database comprising records of valid host ID and POD ID combinations, and the evaluation of the validity of the transmitted host ID and POD ID may comprise comparing the transmitted host ID and POD ID to the valid host ID and POD ID combinations.

In another aspect of the invention, the valid host ID and POD ID combinations are respectively linked to payment information. In another aspect of the invention, the payer information may comprise a user's name, address and card or account number. In another aspect of the invention, the transmitting of the purchase may comprise transmission by either a telephone report of a user or an automatic transmission via a return channel, and the purchase information may comprise a product name or a product number. In another aspect of the invention, the method may be performed within an open cable system, the receiving device may be an open cable receiving device, and the service provider may be an open cable service provider. In another aspect of the invention, the receiving device may comprise a host for receiving open cable broadcasts and a point of deployment POD module; and the host and the POD module may certify each other to generate the host ID and the POD ID.

According to another aspect of the invention, the method for electronic commerce may comprise: generating a host ID and a security module ID by providing a receiving device comprising a host for receiving broadcasts and a security module which certify each other; transmitting purchase information on a product, the host ID and the security module ID to a broadcast service provider to request purchase of the product; determining whether the requested purchase is approved at the broadcast service provider by evaluation of the validity of the transmitted host ID and security module ID; and receiving information on whether the requested purchase is approved or not at the receiving device. In another aspect of the invention, the information on whether is the requested purchase is approved or not may comprise the host ID, the security module ID and information on whether a valid method of payment for the product is available. In another aspect of the invention, the broadcast may be an open cable broadcast. In another aspect of the invention, the security module is Point of Deployment POD module.

BRIEF DESCRIPTION OF THE DRAWINGS

The above aspects and features of the invention will be more apparent by describing certain embodiments of the invention with reference to the accompanying drawings, in which:

FIG. 4 is an example of a construction of a payer information database according to exemplary embodiments of the invention.

DETAILED DESCRIPTION OF EXEMPLARY EMBODIMENTS

Figure 1:
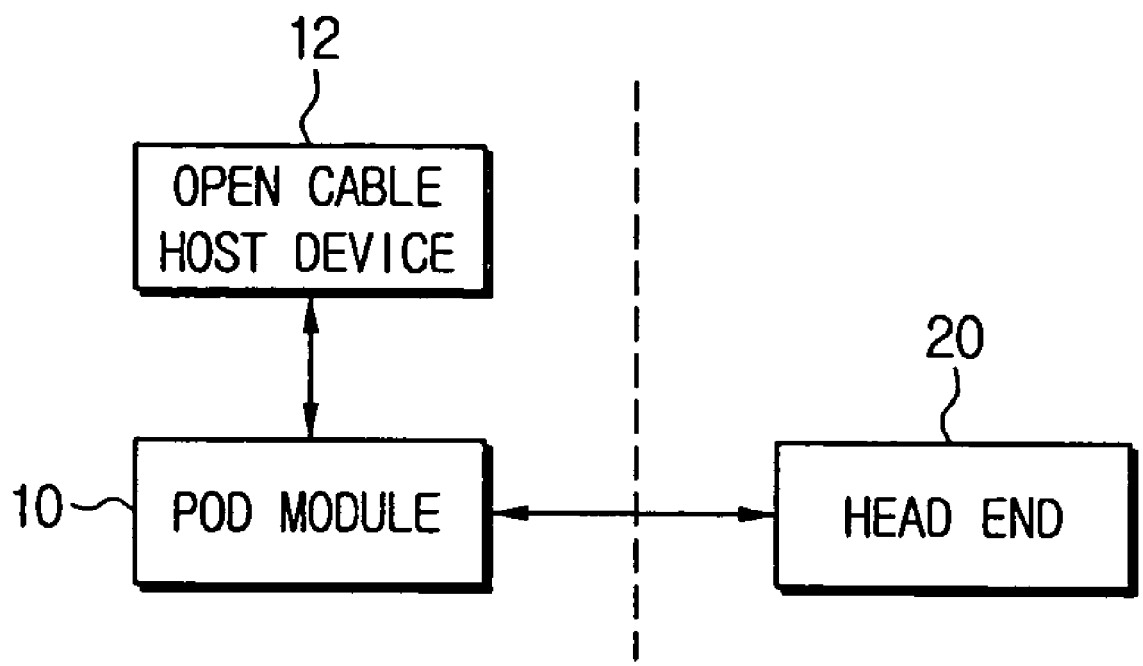
FIG. 1 is a view for explaining open cable.

Exemplary embodiments of the invention will now be described below by reference to the attached Figures. The described exemplary embodiments are intended to assist the understanding of the invention, and are not intended to limit the scope of the invention in any way. In the following description, the same drawing reference numerals are used for the same elements even in different drawings. Also, well-known functions or constructions are not described in detail to avoid obscuring the invention in unnecessary detail.

Further, the described methods for electronic commerce according to the exemplary embodiments of the invention basically apply to broadcasts using open cable, but the method is not limited only to this area and can be applied to other digital broadcasts which satisfy the conditions described below.

FIG. 1 is a view for explaining open cable. Referring to FIG. 1, an open cable host device (hereinafter "host") 12 (e.g., a television) for receiving an open cable broadcast is established at a home, and a point of deployment POD 10, which acts as a security module, is connected to the host 12. POD module 10 is a cable card provided from a broadcast service provider, and when POD module 10 is connected and has completed certification, the host 12 may normally receive an open cable broadcast provided by a broadcast service provider from head end 20.

A conventional device for receiving digital broadcasts receives encrypted contents from a transmission system and selectively decrypts the contents to a general image. In open cable, POD module 10 is a separate module which functions as the reception limit device, and which is provided separately from the host 12. This separation provides a system where the functional features related to a business model of a broadcaster are separated from a receiving device, which allows the receiving device to become available in the market as a general electronic appliance.

Open cable may provide one-way and/or two-way services. The difference between these services is that the two-way service has a return channel, and the one-way service has no return channel. If a return channel is not available, data cannot be transmitted from host 12 to service provider 20, and a user is forced to inform a service provider of necessary information via other appropriate means (e.g. a telephone).

Figure 2:
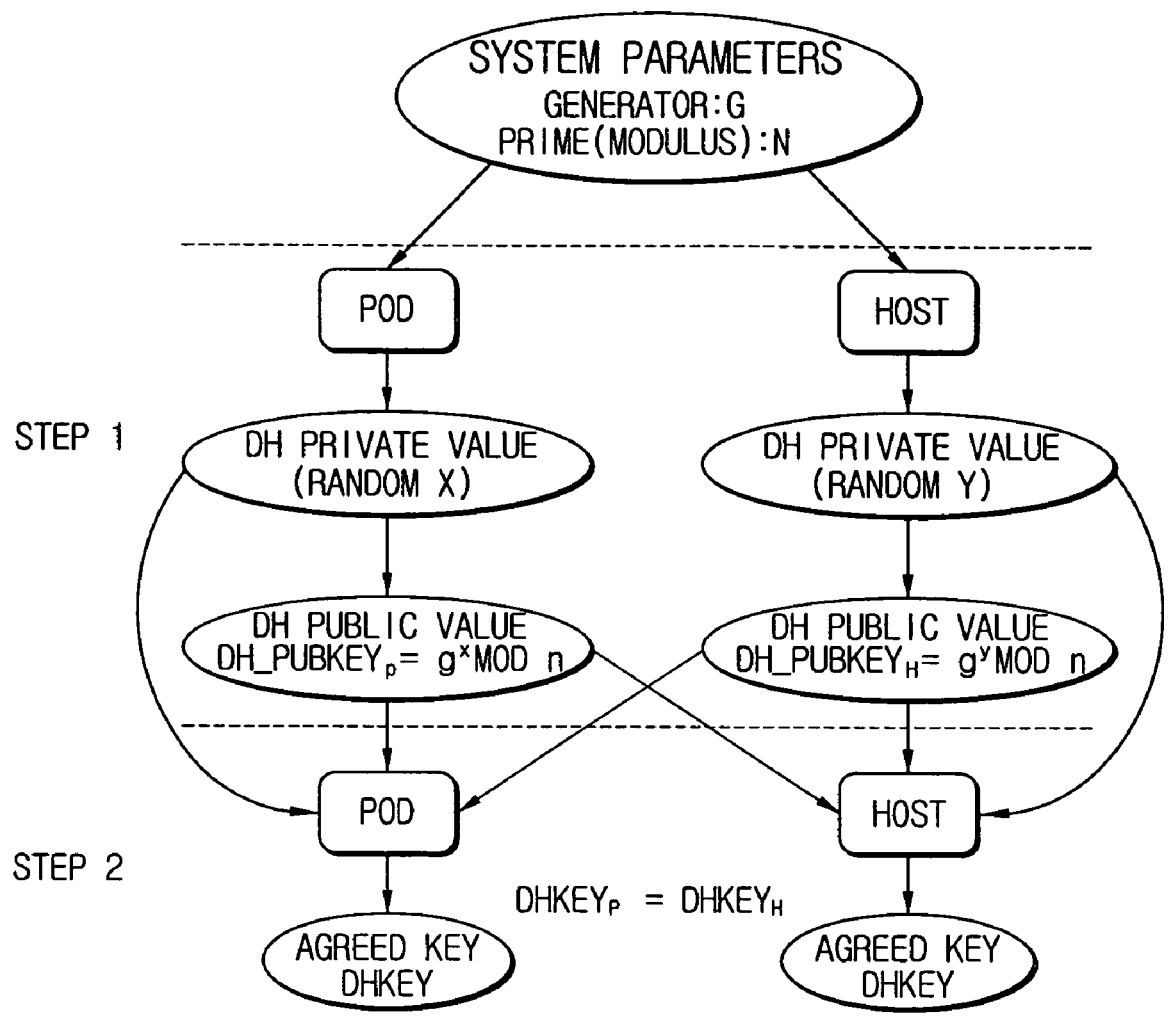
FIG. 2 is a view for explaining a method for sharing a common encryption key for authorization between a host and a POD module.

FIG. 2 is a view for explaining a method for sharing a common encryption key for authorization between host 12 and POD module 10. Referring to FIG. 2, POD module 10 and host 12 are each set with a system parameter at the time of manufacture. When the POD module 10 and host 12 are connected, the POD module 10 and host 12 each generate a public key and a private key. Then, the public key generated by POD module 10 is transmitted to host 12, and vice versa. However, the POD module 10 and host 12 retain their private keys so that they are not exposed. Then, host 12 and POD module 10 each perform multiplication of their respective secret keys, and perform modular operation. As a result, both host 12 and POD module 10, can obtain the same DHKey value. The key value calculated as described above is the secret information that is shared between the host 12 and POD module 10, and the secret information is used as a reference to verify the completion of a binding between POD 10 and host 12 induced thereafter.

Figure 3:
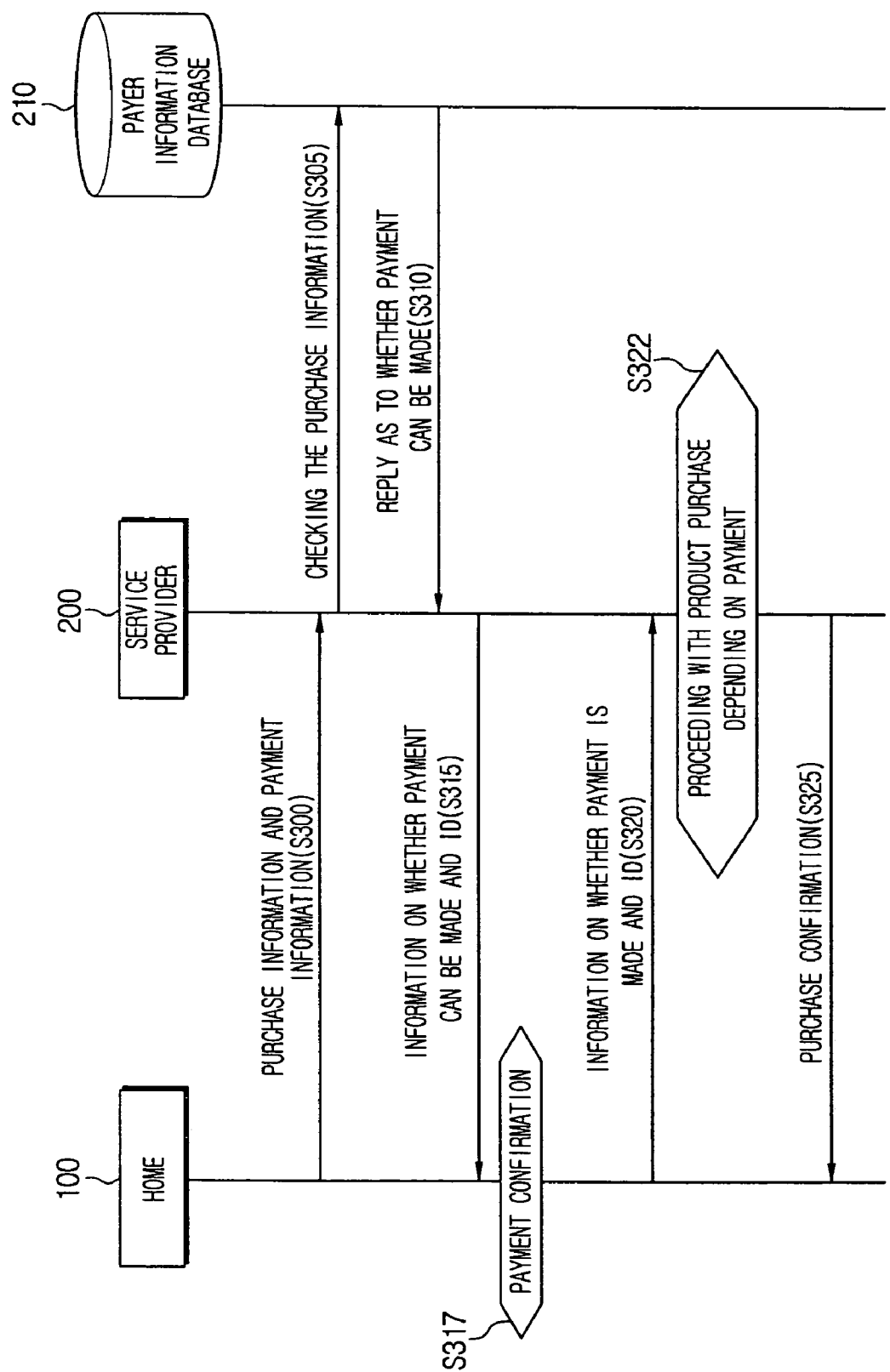
FIG. 3 is a message sequence chart for schematically explaining a method for an electronic commerce according to an exemplary embodiment of the invention.

FIG. 3 is a message sequence chart for schematically explaining a method for electronic commerce using open cable according to an exemplary embodiment of the invention. Referring to FIG. 3, if a user desires to buy a product while watching a home shopping broadcast from a service provider 200, purchase information such as a product name and quantity, and payment information such as the host ID and POD module ID, is transmitted to the service provider from the host 12 which is combined with POD module 10 at home 100 and verified (S300). The service provider 200 looks up the transmitted payment information through a payer information database 210 (S305), which stores information such as a television ID (host ID), a cable ID (POD ID), a name, an address, and a card number, as shown in FIG. 4. Accordingly, the service provider 200 can determine whether payment can be made based on the payment information (S310). The service provider 200 then responds to home 100 providing information such as ID information on the host ID and POD ID and whether payment can be made based on the payment information. A user at home 100 confirms the information from the service provider 200 (S317), and the confirmed information is transmitted to the service provider (S320). The service provider 200 then proceeds with the product purchase according to the payment information of a user (S322), and reports confirmation of the purchase (S325). Based on the above process, payment is completed.

Figure 5:
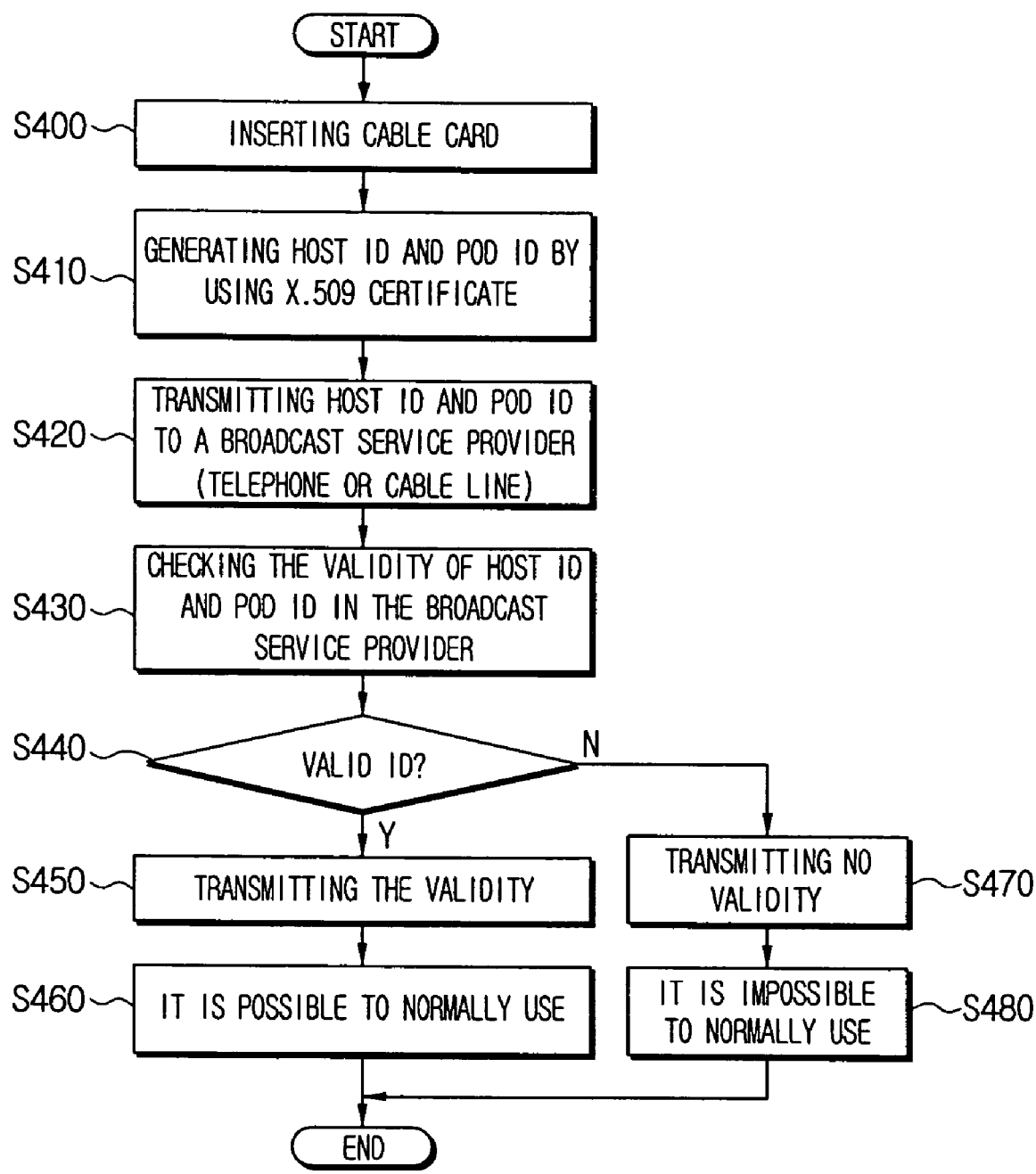
FIG. 5 through FIG. 7 are flow charts for explaining methods for electronic commerce according to exemplary embodiments of the invention.
Figure 6:
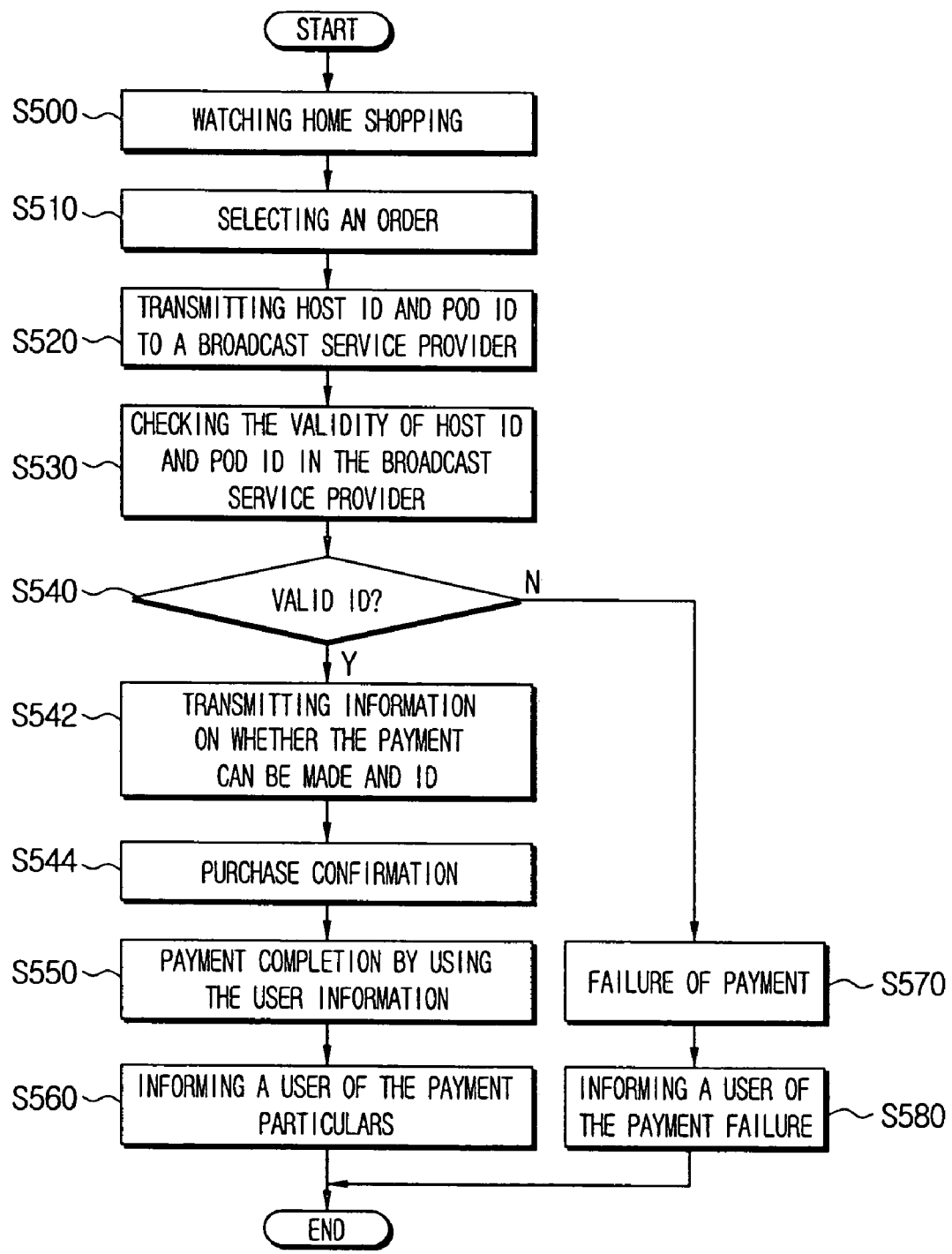
Figure 7:
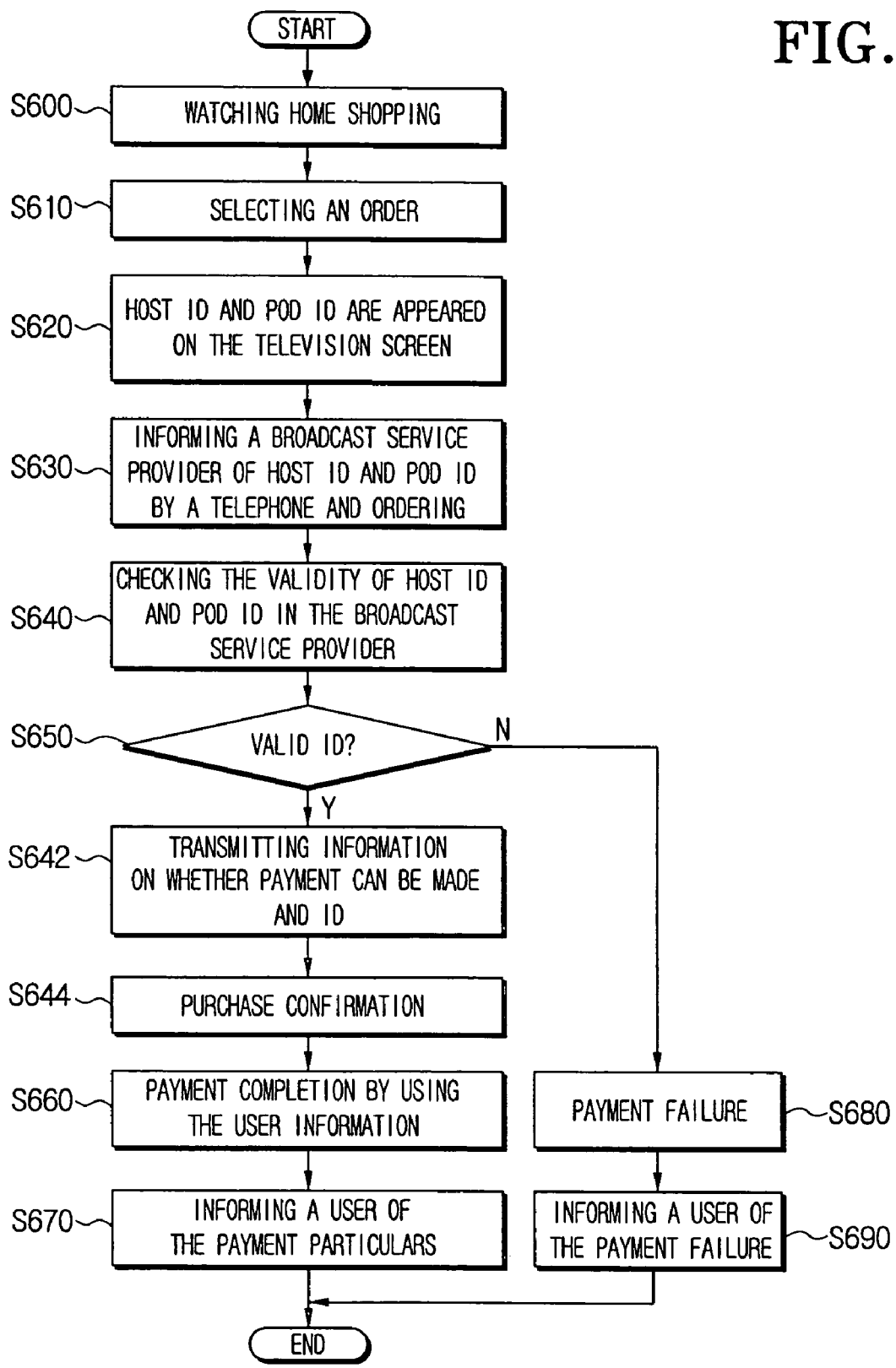

FIG. 5 through FIG. 7 are flow charts for explaining in detail a method for electronic commerce according to exemplary embodiments of the invention.

FIG. 5 is a flow chart for explaining a certification process between a service provider and a system containing host 12 and POD module 10. Referring to FIG. 5, when a cable card (i.e., a POD module 10), is inserted into a host (e.g., a television) for receiving an open cable broadcast (S400), X.509 security certificates are exchanged between the cable card and the television, and a host ID and a POD ID are generated (S410). The generated host ID is 40 bit, the generated POD ID is 64 bit, and the host ID and POD ID always move as a pair. As seen below, only when the pair of IDs are registered with a broadcast service provider can all the services provided from the service provider be used. Once generated, the host ID and the POD ID are transmitted as a pair to a broadcast service provider (S420). If a one-way service is used, the host ID and POD ID have to be separately indicated to the broadcast service provider through a telecommunication medium (e.g., a telephone). If a two-way service is used, the host ID and the POD ID are automatically transmitted to the broadcast service provider through the cable system.

The broadcast service provider then examines the validity of both the host ID and POD ID (S430). If the IDs are valid, the validity is transmitted to the POD module 10 to enable normal use of the host 12 and POD module 10 (S450, S460). In contrast, if the IDs are not valid, the validity is not transmitted, and the host 12 and POD module 10 cannot be normally used (S470, 480). Accordingly, if, for example, the host 12 or POD module 10 are not purchased via a normal route, the successive certification process fails, the open cable broadcast cannot be received.

FIG. 6 is a flow chart for explaining a method of electronic commerce according to an exemplary embodiment of the invention. Referring to FIG. 6, while a user watches home shopping through media for receiving open cable broadcast (S500) (e.g., a television), the user selects an order button on the screen of television (S510), when a product purchase is desired. Then, a name and number of the selected product, a host ID, and a POD ID, are transmitted to the service provider through a return channel (S520).

The service provider then examines whether the host ID and the POD ID are valid (S530, S540). If the pair is valid, user information corresponding to the ID pair is obtained from the payer information database (see FIG. 4). This user information comprises, for example, a name, an address and a card number or account number of a user corresponding to the host ID and the POD ID.

The service provider may then confirm that there are no problems related to the product purchase based on the stored payer information. After this confirmation, the service provider transmits an indication that payment is possible, together with the POD ID, the host ID, and a unique service ID corresponding to the purchase, to the POD module (S542). This information can only be received by a television having the correct pair of host ID and POD ID. Upon receipt by the POD module, a screen for a purchase confirmation is shown on a user's television, and a user can select a confirmation button on the screen to purchase the product or a cancellation button to cancel the purchase (S544). After the purchase is confirmed, the service ID, POD ID and host ID are transmitted to the service provider. The service provider then uses the received information to complete the payment (S550), and transmits payment particulars to the POD module to inform the user (S560).

In contrast, if the POD ID and host ID are not valid, the payment fails (S570). This payment failure is then transmitted to the user (S580).

The service provider stores all registered host IDs and POD IDs in pairs, and also maintains a certification revocation list ("CRL"). Accordingly, if the user attempts to use an unregistered, revoked or otherwise unusable ID, payment cannot be made. If purchase is impossible because of such a reason (or other reasons such as an insufficient balance in the stored account), information indicating the inability of the user to purchase the product may be transmitted to the POD module 10, along with the corresponding IDs including a service ID, (which is a unique number generated at the time of every purchase), so that the information is shown only at the television where the order was made.

FIG. 7 is a flow chart for explaining a method for electronic commerce when a one-way service is used. As discussed above, in contrast to a two-way system, it is impossible to transmit data from the television to the service provider when using such a one-way service. Referring to FIG. 7, while a user watches home shopping via a host (e.g., a television) configured to receive an open cable broadcast (S600), the user may select an order button on the television screen when a purchase is desired (S610). The corresponding host ID and POD ID are then shown on the television screen (S620), and the user has to call the service provider to inform the service provider of the pair of IDs displayed on the screen (S630).

The service provider then determines whether the host ID and the POD ID are valid (S640, S650). If the pair is valid, the service provider obtains user information that corresponds to the pair of IDs from the payer information database. If the IDs are valid, the service provider transmits purchase ability information to the POD module 10. This purchase ability information is transmitted with the service ID, the POD ID and the host ID so that the information is only shown on the television having the correct IDs (S642). The service ID is then displayed on the user's television, and the user can then relay the service ID to the service provider by telephone or other communication means to allow the service provider to confirm the purchase (S644). The service provider then completes the payment transaction (S660), and transmits to the user's television the payment particulars, which are displayed on the television screen to inform the user (S670).

In contrast, if the IDs are not valid, the payment fails (S680), and the service provider informs the user of the payment failure particulars (S690). Similarly, if it is impossible to pay due to an insufficient account balance, the service provider may also transmit this information and the IDs to the user.

In any case, the host ID, the POD ID, and the service ID are all transmitted to show messages on the television of the user attempting a purchase. As described above, in the one-way service (unlike the two-way service), the service ID appears on the screen. The service ID is a unique number, which is generated at every purchase, and which is used to finalize the purchase. If the service ID cannot be seen on the screen, the user's television and/or cable card are considered to be wrong or abnormal. Therefore, the security can be increased because if the other user's ID pair is fraudulently used for purchase, it is impossible to check the information on the television. Thus, it is possible to safely and conveniently use a video service host ID and POD ID for electronic commerce (e.g., a home shopping payment).

As described above, according to an exemplary embodiment of the invention, a user can safely and conveniently pay for a home shopping product via a host (e.g., a television) by using open cable. Specifically, since a host ID and a POD ID are always used in a pair, the method is safer than alternative methods using a single ID. Additionally, a user can purchase a product by using only a host ID and POD ID, so that the user's private information, which is registered with the service provider in conjunction with the host ID and POD ID, is not transmitted via network.

The foregoing embodiment and advantages are merely exemplary and are not to be construed as limiting the invention. The embodiments herein can be readily applied to other types of apparatuses. Also, the description of the embodiments of the invention is intended to be illustrative, and not to limit the scope of the claims, and many alternatives, modifications, and variations will be apparent to those skilled in the art.

What is claimed is:

1. A method for conducting an electronic commerce transaction between a receiving device and a service provider in an open cable environment, the method comprising:
    generating, by the receiving device, a combination of a host ID and a POD ID as a correct pair;
    receiving an open cable broadcast comprising information on a product to be purchased;
    transmitting purchase information on the product, and the combination of the host ID and the POD ID, as a purchase request, to a service provider to request purchase of the product;
    receiving, in response to the service provider validating the combination of the host ID and the POD ID as a correct pair and determining payment can be made, a purchase confirmation request comprising the combination of the host ID and the POD ID, and a unique service ID corresponding to the purchase request; and
    transmitting the combination of the host ID, the POD ID, and the service ID to the service provider as confirmation of the purchase request,
    wherein the confirmation authorizes the service provider to complete the product purchase.

2. The method for electronic commerce according to claim 1, further comprising receiving a confirmation of completion of the purchase request from the service provider.

3. The method for electronic commerce according to claim 1, wherein the transmitting the purchase request comprises transmission by one of a user telephoning the service provider and an automatic transmission via a return channel.

4. The method for electronic commerce according to claim 1, wherein the purchase information comprises at least one of a product name and product number.

5. The method for electronic commerce according to claim 1, wherein the method is performed within an open cable system, the receiving device is an open cable receiving device, and the service provider is an open cable service provider.

6. The method for electronic commerce according to claim 1, wherein the receiving device comprises a host for receiving open cable broadcasts and a point of deployment POD module, and the host and the POD module certify each other to generate the combination of the host ID and the POD ID.

7. The method for electronic commerce according to claim 1, wherein the receiving the combination of the host ID and the POD ID, and the service ID comprises receiving the host ID, the POD ID, the service ID, and information indicating that a valid method of payment for the product is available.

8. The method for electronic commerce according to claim 7, further comprising displaying the host ID, the POD ID, and the service ID on a receiving device having an ID corresponding to the transmitted host ID and POD ID.

9. A method for conducting an electronic commerce transaction between a receiving device and a broadcast service provider in an open cable environment, the method comprising:
    generating, by the receiving device, a host ID and a security module ID as a correct pair, the receiving device comprising a host that receives broadcasts and a security module, wherein the host and security module certify each other to generate the correct pair;
    receiving an open cable broadcast comprising information on a product to be purchased;
    transmitting purchase information on the product, the host ID, and the security module ID, as a purchase request, to the broadcast service provider to request purchase of the product;
    receiving, in response to the service provider validating the combination of the host ID and the POD ID as a correct pair, a purchase confirmation request comprising the combination of the host ID and the POD ID, and a unique service ID corresponding to the purchase request; and
    transmitting the host ID, the security module ID, and the service ID to the service provider as confirmation of the purchase request, wherein the confirmation authorizes the service provider to complete the product purchase.

10. The method for an electronic commerce according to claim 9, wherein the security module is Point of Deployment POD module.

11. A method for conducting an electronic commerce transaction between a receiving device and a service provider in an open cable environment, comprising:
    receiving, by the service provider, a host ID and a POD ID from the receiving device;
    determining that the host ID and the POD ID are one of a valid host ID and POD ID combination;
    transmitting an open cable broadcast to the receiving device in response to the determining, the broadcast comprising information on a product to be purchased;
    receiving a purchase request to purchase the product from the receiving device, the request comprising purchase information on the product, the host ID, and the POD ID;
    generating a unique service ID corresponding to the purchase request;
    transmitting the host ID, the POD ID, and the service ID to the receiving device;
    receiving the host ID, the POD ID, and the service ID as confirmation of the purchase request authorizing the service provider to complete the product purchase from the receiving device; and
    completing the transaction in response to receiving the confirmation.

12. The method for electronic commerce according to claim 11, further comprising:
    determining that the host ID, the POD ID, and the service ID received from the receiving device are valid.

13. The method for electronic commerce according to claim 11, wherein the determining that the host ID and the POD ID are one of a valid host ID and POD ID combination comprises:
    maintaining a payer information database comprising records of valid host ID and POD ID combinations; and determining that the received host ID and POD ID is one of the records of valid host ID and POD ID combinations.

14. The method for electronic commerce according to claim 13, wherein the valid host ID and POD ID combinations are respectively linked to payment information.

15. The method for electronic commerce according to claim 14, wherein the payment information comprises a user's name, address and card or account number.

* * * * *